(12) United States Patent
Wang et al.

(10) Patent No.: US 11,824,637 B2
(45) Date of Patent: Nov. 21, 2023

(54) GENERATING WIRELESS REFERENCE SIGNALS IN A DIFFERENT DOMAIN FOR TRANSMISSION

(71) Applicant: AT&T Intellectual Property I, L.P., Atlanta, GA (US)

(72) Inventors: Xiaoyi Wang, Austin, TX (US); Salam Akoum, Austin, TX (US); Ralf Bendlin, Cedar Park, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/419,809

(22) Filed: May 22, 2019

(65) Prior Publication Data

US 2020/0374068 A1 Nov. 26, 2020

(51) Int. Cl.
*H04L 5/00* (2006.01)
*H04L 27/26* (2006.01)

(52) U.S. Cl.
CPC ........ *H04L 5/0048* (2013.01); *H04L 27/2613* (2013.01)

(58) Field of Classification Search
None
See application file for complete search history.

(56) References Cited

U.S. PATENT DOCUMENTS

| | | | |
|---|---|---|---|
| 4,644,562 | A | 2/1987 | Kavehrad et al. |
| 6,018,317 | A | 1/2000 | Dogan et al. |
| 6,654,429 | B1 | 11/2003 | Li |
| 6,826,240 | B1 | 11/2004 | Thomas et al. |
| 7,292,651 | B2 | 11/2007 | Li |
| 7,551,547 | B2 | 6/2009 | Ghosh |
| 7,986,614 | B2 | 7/2011 | Ghosh |
| 8,064,507 | B1 | 11/2011 | Cheng et al. |

(Continued)

FOREIGN PATENT DOCUMENTS

| | | | |
|---|---|---|---|
| WO | 2017/044501 A1 | 3/2017 | |
| WO | 2017/10666 A1 | 6/2017 | |
| WO | WO-2017100666 A1 * | 6/2017 | ............... H04B 7/01 |

OTHER PUBLICATIONS

Non-Final Office Action received for U.S. Appl. No. 16/455,123 dated Sep. 3, 2020, 18 pages.

(Continued)

*Primary Examiner* — Christopher T Wyllie
(74) *Attorney, Agent, or Firm* — Amin, Turocy & Watson, LLP

(57) ABSTRACT

According to an embodiment, a system can comprise a processor and a memory that can store executable instructions that, when executed by the processor, facilitate performance of operations. The operations can include generating a reference signal in an initial domain, and first transforming the reference signal into a time-frequency domain, resulting in a first transformed reference signal. The operations can further include transmitting the first transformed reference signal to a user equipment for a second transformation to be applied to the transformed reference signal by the user equipment, resulting in a second transformed reference signal. Further, in response to the transmitting the first transformed reference signal, receiving a signal from the user equipment that was configured, based on the second transformed reference signal.

20 Claims, 10 Drawing Sheets

(56) References Cited

U.S. PATENT DOCUMENTS

| | | |
|---|---|---|
| 8,649,254 B2 | 2/2014 | Ghosh |
| 8,675,769 B1 | 3/2014 | Eliaz |
| 9,197,283 B1 | 11/2015 | Nguyen et al. |
| 9,686,702 B2 | 6/2017 | Beyme |
| 9,991,976 B2 | 6/2018 | Hu et al. |
| 10,020,930 B2 | 7/2018 | Pelissier et al. |
| 10,171,214 B2 | 1/2019 | Wang et al. |
| 10,257,105 B2 | 4/2019 | Majmundar et al. |
| 10,355,887 B2 | 7/2019 | Hadani et al. |
| 10,404,337 B1 | 9/2019 | Tan et al. |
| 10,530,504 B2* | 1/2020 | Fechtel ............... H04B 17/336 |
| 10,547,397 B2 | 1/2020 | Chopra et al. |
| 10,651,912 B2 | 5/2020 | Wang et al. |
| 10,666,479 B2 | 5/2020 | Hadani et al. |
| 10,673,659 B2 | 6/2020 | Hadani et al. |
| 10,708,091 B2 | 7/2020 | Fechtel |
| 10,826,591 B1 | 11/2020 | Akoum et al. |
| 10,886,985 B2 | 1/2021 | Ramireddy et al. |
| 10,886,991 B2 | 1/2021 | Akoum et al. |
| 10,951,454 B2* | 3/2021 | Delfeld ................. H04L 27/34 |
| 10,979,151 B2 | 4/2021 | Bendlin et al. |
| 11,038,733 B2* | 6/2021 | Hadani ................. H04L 27/32 |
| 11,050,530 B2* | 6/2021 | Wang .................. H04L 27/261 |
| 11,070,329 B2 | 7/2021 | Hadani et al. |
| 11,082,352 B2 | 8/2021 | Majmundar et al. |
| 11,184,074 B2 | 11/2021 | Akoum et al. |
| 11,201,680 B2 | 12/2021 | Bendlin et al. |
| 11,387,882 B2 | 7/2022 | Wang et al. |
| 11,626,953 B2* | 4/2023 | Wang ..................... H04L 5/005 |
| | | 370/329 |
| 2005/0002461 A1 | 1/2005 | Giannakis et al. |
| 2006/0176941 A1 | 8/2006 | Nieto et al. |
| 2006/0269016 A1 | 11/2006 | Long et al. |
| 2007/0230335 A1* | 10/2007 | Sang ..................... H04L 47/10 |
| | | 370/252 |
| 2008/0304416 A1* | 12/2008 | Fodor ................... H04W 72/52 |
| | | 370/237 |
| 2009/0003134 A1 | 1/2009 | Nuttall et al. |
| 2009/0129493 A1 | 5/2009 | Zhang et al. |
| 2009/0274252 A1 | 11/2009 | Ghosh |
| 2010/0111231 A1 | 5/2010 | Koorapaty et al. |
| 2010/0271259 A1 | 10/2010 | Stafforf et al. |
| 2011/0150052 A1 | 6/2011 | Erell et al. |
| 2011/0243284 A1 | 10/2011 | Ghosh |
| 2011/0275392 A1* | 11/2011 | Haustein ............... H04L 5/0048 |
| | | 455/67.11 |
| 2011/0286507 A1 | 11/2011 | Yu et al. |
| 2012/0069887 A1 | 3/2012 | Park et al. |
| 2012/0082190 A1* | 4/2012 | Zhu ....................... H04B 7/063 |
| | | 375/267 |
| 2012/0082274 A1 | 4/2012 | Bury |
| 2012/0114072 A1 | 5/2012 | Liu et al. |
| 2013/0051450 A1 | 2/2013 | Ghosh |
| 2013/0114654 A1 | 5/2013 | Gomadam |
| 2013/0163537 A1 | 6/2013 | Anderson et al. |
| 2013/0201912 A1 | 8/2013 | Sheng et al. |
| 2013/0329772 A1 | 12/2013 | Wernersson et al. |
| 2014/0161154 A1 | 6/2014 | Hadani et al. |
| 2014/0169406 A1 | 6/2014 | Hadani et al. |
| 2014/0169437 A1 | 6/2014 | Hadani et al. |
| 2014/0177745 A1 | 6/2014 | Krishnamurthy et al. |
| 2014/0286329 A1* | 9/2014 | Han ....................... H04L 5/0053 |
| | | 370/344 |
| 2014/0301492 A1 | 10/2014 | Xin et al. |
| 2015/0043439 A1 | 2/2015 | Sajadieh et al. |
| 2015/0078472 A1 | 3/2015 | Vook et al. |
| 2015/0117519 A1 | 4/2015 | Kim et al. |
| 2016/0119069 A1 | 4/2016 | Mamidwar et al. |
| 2016/0119096 A1* | 4/2016 | Sun ....................... H04W 76/27 |
| | | 370/329 |
| 2016/0119097 A1 | 4/2016 | Nam et al. |
| 2016/0156394 A1 | 6/2016 | Kim et al. |
| 2017/0012749 A1 | 1/2017 | Rakib et al. |
| 2017/0012810 A1 | 1/2017 | Rakib et al. |
| 2017/0013486 A1 | 1/2017 | Beyme |
| 2017/0033899 A1 | 2/2017 | Rakib et al. |
| 2017/0041061 A1 | 2/2017 | Lee et al. |
| 2017/0048029 A1 | 2/2017 | Lee et al. |
| 2017/0048810 A1 | 2/2017 | Sahlin et al. |
| 2017/0064676 A1 | 3/2017 | Lee et al. |
| 2017/0078054 A1 | 3/2017 | Hadani et al. |
| 2017/0093474 A1 | 3/2017 | Lee et al. |
| 2017/0099122 A1 | 4/2017 | Hadani et al. |
| 2017/0099607 A1 | 4/2017 | Hadani et al. |
| 2017/0149594 A1 | 5/2017 | Rakib et al. |
| 2017/0149595 A1 | 5/2017 | Rakib et al. |
| 2017/0288710 A1 | 10/2017 | Delfeld et al. |
| 2017/0338925 A1* | 11/2017 | Wei ..................... H04W 52/0229 |
| 2018/0109284 A1 | 4/2018 | Hadani et al. |
| 2018/0198497 A1 | 7/2018 | Wei et al. |
| 2018/0205481 A1 | 7/2018 | Shlomo et al. |
| 2018/0206157 A1* | 7/2018 | Zhu ..................... H04W 36/0088 |
| 2018/0227159 A1 | 8/2018 | Rakib et al. |
| 2018/0262306 A1* | 9/2018 | Hadani ................. H04L 5/0023 |
| 2018/0302176 A1* | 10/2018 | Jeon ....................... H04B 15/02 |
| 2018/0309598 A1 | 10/2018 | Pena Campos et al. |
| 2018/0323887 A1* | 11/2018 | Azarian Yazdi ...... H04W 24/08 |
| 2019/0013849 A1 | 1/2019 | Kobayashi |
| 2019/0013983 A1 | 1/2019 | Gao et al. |
| 2019/0036741 A1 | 1/2019 | Hadani et al. |
| 2019/0044682 A1 | 2/2019 | Hebron et al. |
| 2019/0068304 A1 | 2/2019 | Fechtel |
| 2019/0081836 A1 | 3/2019 | Hadani et al. |
| 2019/0089441 A1 | 3/2019 | Sivahumaran |
| 2019/0199456 A1 | 6/2019 | Chopra et al. |
| 2019/0207661 A1 | 7/2019 | Froberg Olsson et al. |
| 2019/0230673 A1* | 7/2019 | Ren ....................... H04W 72/541 |
| 2019/0238189 A1 | 8/2019 | Delfeld et al. |
| 2019/0245602 A1* | 8/2019 | Wang ..................... H04L 25/021 |
| 2019/0268112 A1 | 8/2019 | Parra Michel et al. |
| 2019/0312623 A1 | 10/2019 | Park et al. |
| 2019/0326959 A1 | 10/2019 | Davydov et al. |
| 2019/0327053 A1* | 10/2019 | Hu ....................... H04L 27/2613 |
| 2019/0342126 A1 | 11/2019 | Hadani et al. |
| 2019/0342136 A1 | 11/2019 | Hadani et al. |
| 2019/0379422 A1 | 12/2019 | Hadani et al. |
| 2020/0028617 A1 | 1/2020 | Landis et al. |
| 2020/0045569 A1 | 2/2020 | Seo et al. |
| 2020/0052931 A1 | 2/2020 | Fechtel |
| 2020/0099434 A1 | 3/2020 | Wang et al. |
| 2020/0137774 A1 | 4/2020 | Molisch et al. |
| 2020/0177249 A1 | 6/2020 | Ramireddy et al. |
| 2020/0200849 A1 | 6/2020 | Grodzki et al. |
| 2020/0204220 A1 | 6/2020 | Zirwas et al. |
| 2020/0235799 A1 | 7/2020 | Wang et al. |
| 2020/0244320 A1 | 7/2020 | Wang et al. |
| 2020/0259692 A1 | 8/2020 | Hadani et al. |
| 2020/0259697 A1 | 8/2020 | Delfeld et al. |
| 2020/0287672 A1 | 9/2020 | Namboodiri et al. |
| 2020/0344021 A1* | 10/2020 | Fang ..................... H04L 5/0094 |
| 2020/0373984 A1 | 11/2020 | Akoum et al. |
| 2020/0374014 A1 | 11/2020 | Bendlin et al. |
| 2020/0374068 A1* | 11/2020 | Wang ................... H04L 27/2639 |
| 2020/0389268 A1 | 12/2020 | Sathyanarayan et al. |
| 2020/0412500 A1* | 12/2020 | Wang ..................... H04L 5/005 |
| 2021/0083742 A1 | 3/2021 | Akoum et al. |
| 2021/0099210 A1 | 4/2021 | Ramireddy et al. |
| 2021/0135905 A1 | 5/2021 | Kons et al. |
| 2021/0143885 A1 | 5/2021 | Grossmann et al. |
| 2021/0167825 A1 | 6/2021 | Ramireddy et al. |
| 2021/0167879 A1 | 6/2021 | Vela Garcia et al. |
| 2021/0194602 A1 | 6/2021 | Bendlin et al. |
| 2021/0321417 A1* | 10/2021 | Kim ..................... H04L 5/0048 |
| 2021/0351880 A1 | 11/2021 | Hadani et al. |
| 2022/0038155 A1 | 2/2022 | Akoum et al. |

(56) References Cited

U.S. PATENT DOCUMENTS

2022/0060263 A1 2/2022 Bendlin et al.
2022/0173855 A1 6/2022 Akoum et al.

OTHER PUBLICATIONS

International Search Report and Written Opinion received for PCT Application Serial No. PCT/US2020/030805 dated Aug. 11, 2020, 12 pages.
Non-Final Office Action received for U.S. Appl. No. 16/419,561 dated Sep. 17, 2020, 20 pages.
Notice of Allowance received for U.S. Appl. No. 16/419,432 dated Sep. 23, 2020, 35 pages.
Non-Final Office Action received for U.S. Appl. No. 16/419,432 dated May 14, 2020, 13 pages.
Notice of Allowance received for U.S. Appl. No. 16/455,123 dated Jan. 27, 2021, 50 pages.
Notice of Allowance received for U.S. Appl. No. 16/419,561 dated Dec. 10, 2020, 35 pages.
International Preliminary Report on Patentability received for PCT Application Serial No. PCT/US2020/030805 dated Jan. 6, 2022, 8 pages.
Communication pursuant to Rules 161(1) and 162 EPC received for E.P. Patent Application Serial No. 20727489.5 dated Feb. 3, 2022, 3 pages.
Notice of Allowance received for U.S. Appl. No. 17/195,747 dated Aug. 9, 2021, 52 pages.
Notice of Allowance received for U.S. Appl. No. 17/104,834 dated Jul. 16, 2021, 65 pages.
Examination Report received for Indian Patent Application Serial No. 202147054104 dated Mar. 29, 2022, 7 pages.
Notice of Allowance received for U.S. Appl. No. 17/453,982 dated Jun. 23, 2022, 96 pages.
Liu et al., "Pulse-Doppler Signal Processing with Quadrature Compressive Sampling", IEEE Transactions on Aerospace and Electronic Systems, vol. 51, No. 2, 2015, pp. 1217-1230.
Bar-Ilan et al., "Sub-Nyquist Radar via Doppler Focusing", IEEE Transactions on Signal Processing, vol. 62, No. 7, 2014, pp. 1796-1811.
Non Final Office Action received for U.S. Appl. No. 17/244,996 dated Aug. 4, 2022, 44 pages.
Non Final Office Action received for U.S. Appl. No. 17/504,878 dated Jun. 22, 2022, 132 pages.
Notice of Allowance received for U.S. Appl. No. 17/504,878 dated Oct. 3, 2022, 129 pages.
Notice of Allowance dated Nov. 28, 2022 for U.S. Appl. No. 17/244,996, 25 pages.

* cited by examiner

600

Symplectic Fourier Transform 650

$$r'(n,m) = \underbrace{\frac{1}{N_{S,\tau}N_{S,v}} \sum_{k=0}^{N_{S,v}-1} \sum_{l=0}^{N_{S,\tau}-1}}_{610} \underbrace{r(k,l)}_{620} e^{-j2\pi\left(\frac{ml}{N_{S,\tau}} - \frac{nk}{N_{S,v}}\right)}$$

FIG. 6

GENERATING WIRELESS REFERENCE SIGNALS IN A DIFFERENT DOMAIN FOR TRANSMISSION

TECHNICAL FIELD

The subject application is related to wireless communication systems, and, for example, using reference signals to improve antenna connections, in a wireless network.

BACKGROUND

With the increase in the use of modern networks comes an increase in the number of antennas deployed. Technologies such as multiple input multiple output (MIMO) require even more antennas. In some circumstance, when connecting to one or more antennas, a user device receives a reference signal, specifying an identifier for the antenna and characteristics of the signal.

With the increase in antennas deployed, comes an increase in the number of reference signals transmitted in an area. In some circumstances, reference signals are allocated resources that are shared with other signals, e.g., data transmission. In some circumstances reference signals can impair the transmission of other signals.

BRIEF DESCRIPTION OF THE DRAWINGS

The technology described herein is illustrated by way of example and not limited in the accompanying figures in which like reference numerals indicate similar elements and in which:

FIG. 6 illustrates an example formula that can be used with an approach described in FIG. 4, that is, transforming the RS created in another domain (e.g., delay-Doppler) into the time/frequency domain for transmission, in accordance with one or more embodiments.

DETAILED DESCRIPTION

Figure 1:
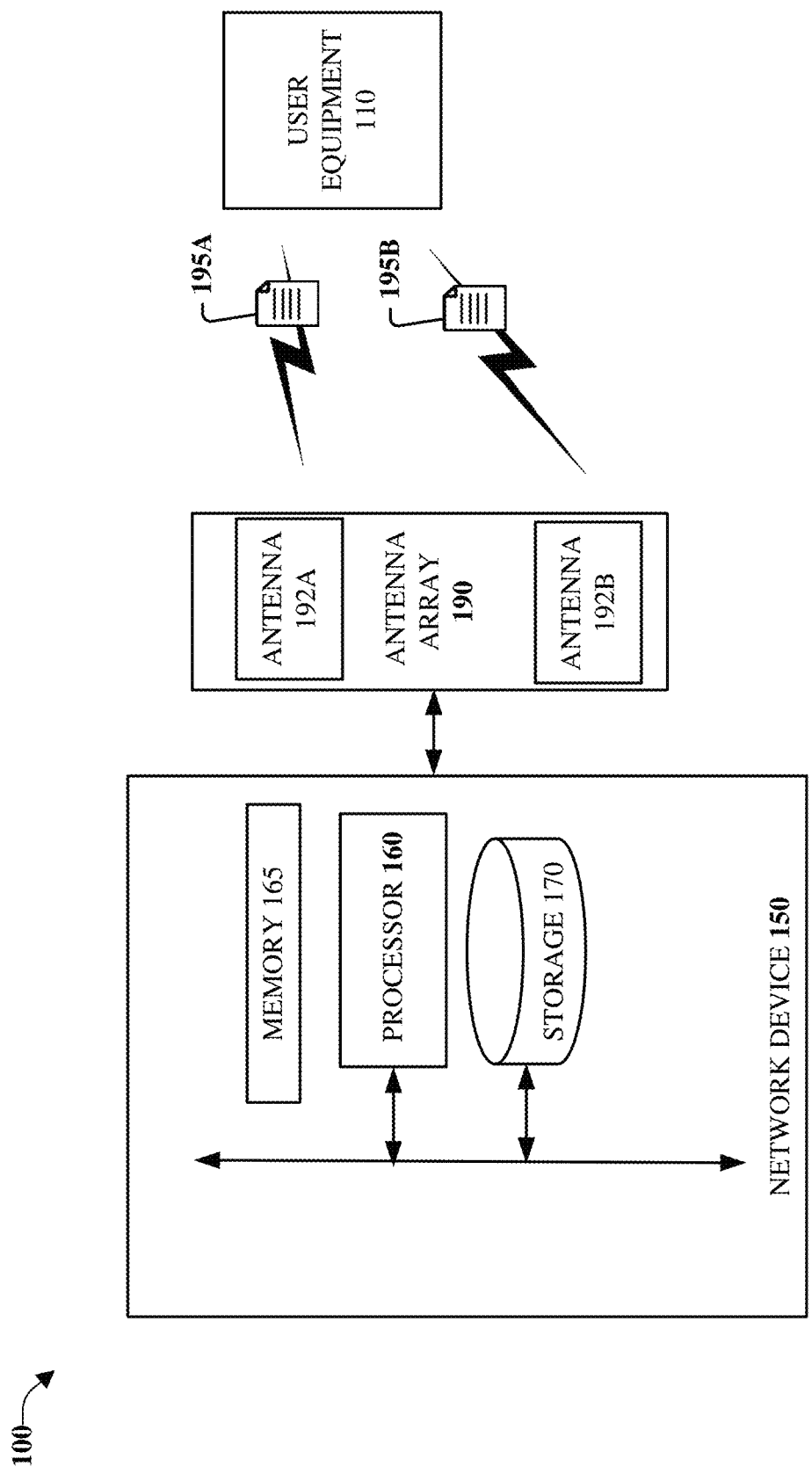
FIG. 1 illustrates a block diagram of an example, non-limiting system that includes a network device communicatively coupled to a base station and a user equipment by wireless connections, in accordance with one or more embodiments.

Generally speaking, one or more embodiments described herein provide mechanisms and signaling to facilitate transforming wireless reference signals into a different domain for transmission to user equipment, in accordance with one or more embodiments.

In addition, one or more embodiments described herein can be directed towards a multi-connectivity framework that supports the operation of New Radio (NR, also termed 5G). As will be understood, one or more embodiments can allow an integration of V2X UEs with network assistance, by supporting control and mobility functionality on cellular links (e.g. Long Term Evolution (LTE) or NR). One or more embodiments can provide benefits including, system robustness, reduced overhead, and global resource management, while facilitating direct communication links via a NR sidelink.

It should be understood that any of the examples and terms used herein are non-limiting. For instance, while examples are generally directed to non-standalone operation where the NR backhaul links are operating on mmWave bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device or simply "network device" is used herein. These terms may be used interchangeably, and refer to any type of network node that serves user equipment and/or connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS), etc.

In some embodiments, the non-limiting term integrated access backhaul (IAB) is used. In Release 16 of the 3rd Generation Partnership Project (3GPP) specification, an IAB framework based on fixed relays is standardized. This Release 16 IAB framework allows for a multi-hop network based on a hierarchical tree architecture. As described further below, in some embodiments, one or more of the non-limiting terms "relay node," "mobile relay node," "anchor node," and "mobile base station" can describe mobile relay nodes supporting a mobile IAB network. It should be appreciated that notwithstanding some descriptions herein referring to concepts of wireless base stations being "fixed," "stationary" or similar terms, and "mobile," "mobile," "nonfixed" or similar terms, these terms describing a capacity for movement are not limiting, e.g., in different embodiments, a mobile base station described herein can be fixed in position, and vice versa.

In some embodiments the non-limiting term user equipment (UE) is used. It can refer to any type of wireless device that communicates with a radio network node in a cellular or mobile communication system. Examples of user equipment are target device, device to device (D2D) user equipment, machine type user equipment or user equipment capable of machine to machine (M2M) communication, PDA, Tablet, mobile terminals, smart phone, laptop embedded equipped (LEE), laptop mounted equipment (LME), USB dongles, etc.

Some embodiments are described in particular for 5G new radio systems. The embodiments are however applicable to any radio access technology (RAT) or multi-RAT system where the user equipment operates using multiple carriers e.g. LTE FDD/TDD, WCMDA/HSPA, GSM/GERAN, Wi Fi, WLAN, WiMax, CDMA2000 etc.

Broadly speaking, one or more embodiments can improve the operation of transmitting wireless reference signals. By generating the reference signals in an initial domain (e.g., delay Doppler), then transforming the reference signals into a frequency time domain for transmission, one or more embodiments can improve the transmission of the reference signals in ways including, reducing the overhead of the signals, and reducing the density of the signals.

FIG. 1 illustrates a block diagram of an example, non-limiting system 100 that includes network device 150 communicatively coupled to antenna array 190. Antenna array include antennas 192A-B communicatively coupled to user equipment 110 by wireless connections, in accordance with one or more embodiments. A non-limiting example of signals that can be transmitted using approaches discussed herein are reference signals 195A-B.

According to multiple embodiments, network device 150 includes memory 165 that can store one or more computer and/or machine readable, writable, and/or executable components and/or instructions that, when executed by processor 160, can facilitate performance of operations defined by the executable component(s) and/or instruction(s). For example, memory 165 can store computer executable components 120 that can, when executed by processor 160, execute the components.

In some embodiments, memory 165 can comprise volatile memory (e.g., random access memory (RAM), static RAM (SRAM), dynamic RAM (DRAM), etc.) and/or non-volatile storage 170 (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more central processing unit, multi-core processor, microprocessor, dual microprocessors, microcontroller, System on a Chip (SOC), array processor, vector processor, and/or another type of processor. Further examples of processor 160 are described below with reference to processing unit 1004 of FIG. 10. Such examples of processor 160 can be employed to implement any embodiments of the subject disclosure.

It should be appreciated that the embodiments of the subject disclosure depicted in various figures disclosed herein are for illustration only, and as such, the architecture of such embodiments are not limited to the systems, devices, and/or components depicted therein. For example, in some embodiments, network device 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

Figure 2:
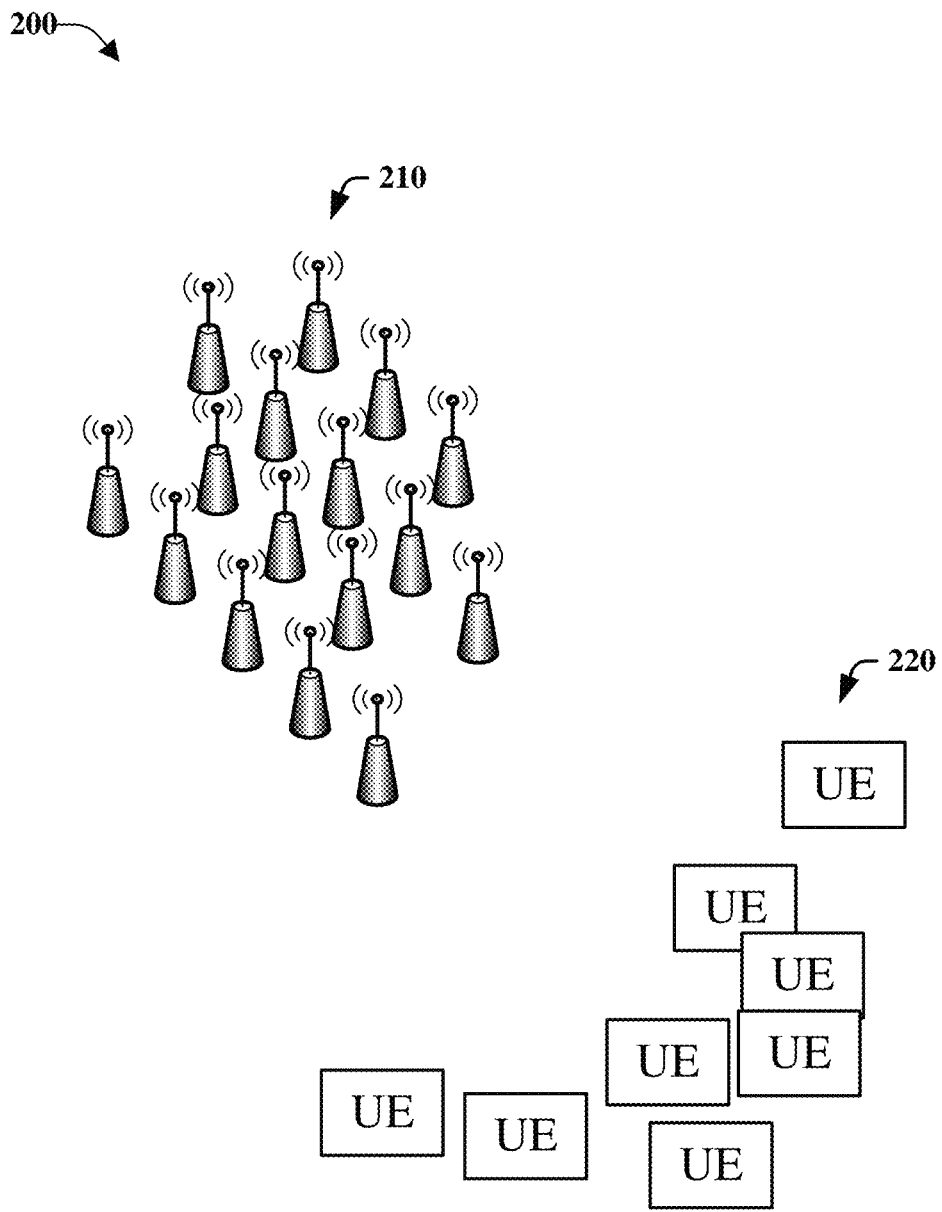
FIG. 2 illustrates an example wireless communication system showing multiple example antennas and multiple UEs, in accordance with one or more embodiments.

FIG. 2 illustrates an example wireless communication system 200 showing multiple example antennas 210 and multiple UEs 220, in accordance with one or more embodiments. For purposes of brevity, description of like elements and/or processes employed in other embodiments is omitted.

In one or more embodiments, in order for a UE to use MIMO, UE 110 generally must identify the number of antennas available, and the channel of each antenna 210 to be used. In some circumstances each antenna can broadcast a specific, known reference signal, that can be used by UEs 110 to both identify the antenna and assess channel state information (CSI).

As wireless connections have increased, the number of antennas, reference signals, and data have increased. In some implementations, data and reference signals can share the same available resources. One way to facilitate this sharing id by using a time/frequency grid. Example grids are used with FIGS. 3 and 5 below to illustrate aspects of one or more embodiments.

Figure 3:
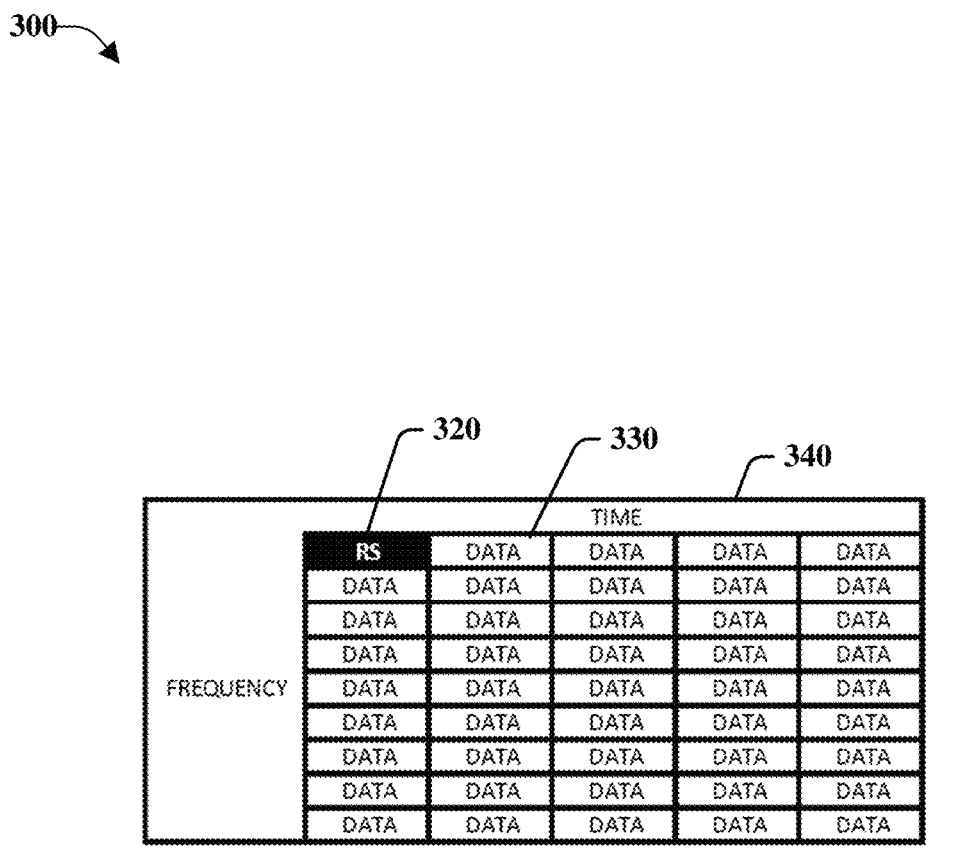
FIG. 3 illustrates a non-limiting, example time/frequency grid with resource elements (REs) scheduled to RS and data signals (DATA), in accordance with one or more embodiments.

FIG. 3 illustrates a non-limiting, example 300 time/frequency grid 340 with resource elements (REs) scheduled to RS and data signals (DATA), in accordance with one or more embodiments. Example grid 340 is shown as smaller than typical grids used for scheduling, e.g., a typical grid is 12 by 14. For purposes of brevity, description of like elements and/or processes employed in other embodiments is omitted.

Time/frequency grid 340 includes grid boxes for REs allocated to RS 320 and DATA 330 signals. Although not shown, in some implementations, both RS and DATA signals can be allocated to the RE, potentially causing interference with one or both of these signals. This sharing is also called non-orthogonal multiplexing. While data can be more resistant to interference (because of coding), when RS signals are degraded, CSI estimation accuracy can decrease. As described with FIGS. 4 and 5 below, one or more embodiments can reduce this interference.

Figure 4:
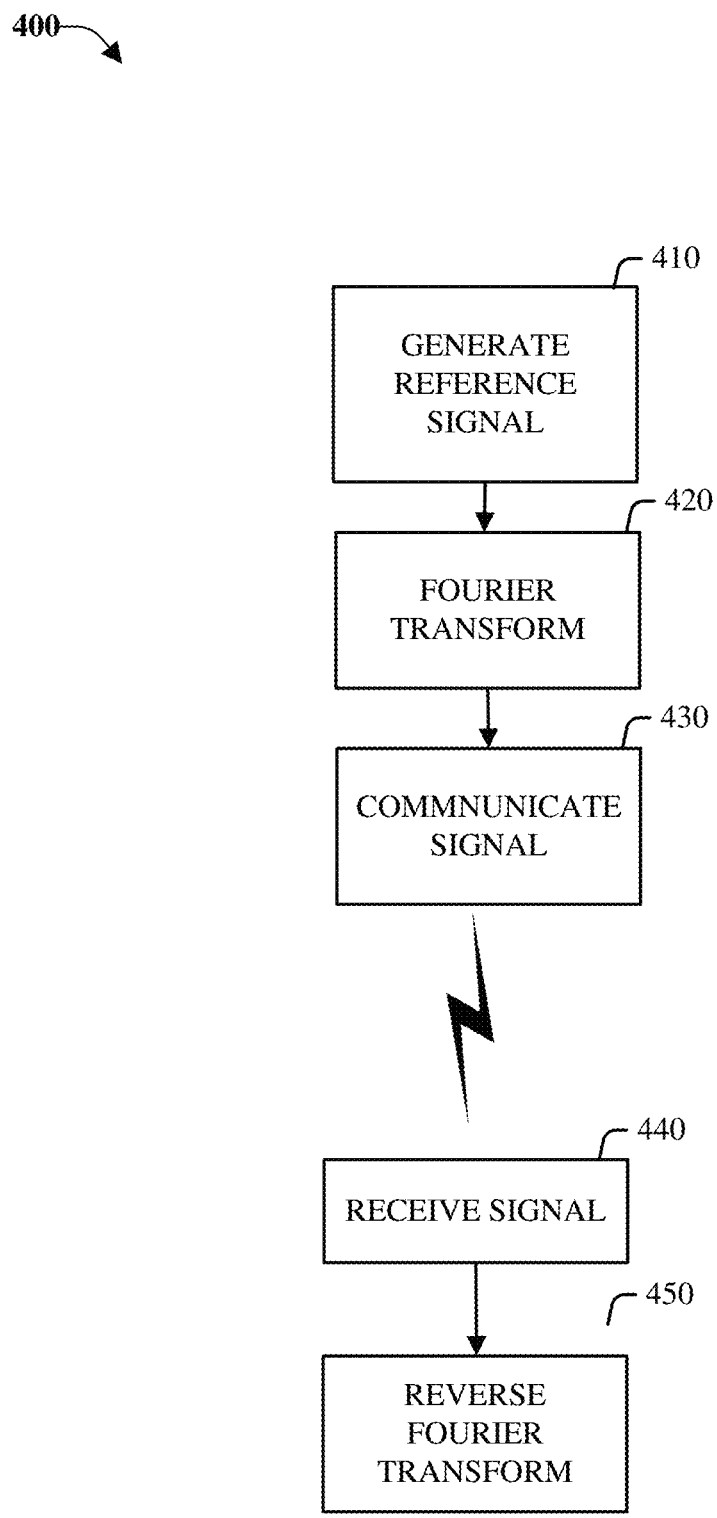
FIG. 4 illustrates a non-limiting, example, series of blocks that describe approaches to transmitting RS, according to one or more embodiments.

FIG. 4 illustrates a non-limiting, example 400, series of blocks 410-450 that describe approaches to transmitting RS, according to one or more embodiments. For purposes of brevity, description of like elements and/or processes employed in other embodiments is omitted.

At block 410, a reference signal is generated. In contrast to different approaches, one or more embodiments can generate the reference signal in a domain different from the domain normally used, e.g., the time/frequency domain. As discussed with FIG. 5 below, this use of a different domain can improve the ways that RS use grid 340. An example initial domain that can be used is the delay-Doppler domain. Other domains can also be used in some circumstances.

At block 420, the RS in the initial domain can be transformed into a domain for scheduling and transmission. One way that can be used by embodiments is to transform the RS using a Fourier transform, one type being a symplectic Fourier transformation. An example domain that can be used is the time/frequency domain, and use of this domain can enable the use of grid 340 discussed above.

At blocks 430 and 440, the transformed RS can be respectively communicated to UE 110, and received by UE 110. At block 450, in one or more embodiments, to enable the use of the RS data by UE 110, the received RS data can be transformed back to the initial domain, e.g., reversing the Fourier transform discussed above. An example formula that can be used, by one or more embodiments, to transform for transmission, and reverse transmission for use, is depicted in FIG. 6, discussed below.

In an alternative embodiment, after the RS is transformed into the time/frequency domain, the transformed RS can be multiplexed with another signal in the time/frequency domain, and this multiplexed signal is transmitted to UE 110. At UE 110, the multiplexed signal can be separately processed to use the individual multiplexed parts, e.g., one copy of the stream is transformed, like in the other embodiments, back into the initial domain to be used as the RS. Another copy of the stream is decoded normally by processes similar to those that would be used if no multiplexing had occurred. In this approach, the first transformed signal is treated as noise in the signal being decoded. Further, in a circumstance where the other signal was multiplexed in at a higher signal strength, the noise added by the transformed signal can be minimal.

Figure 5:
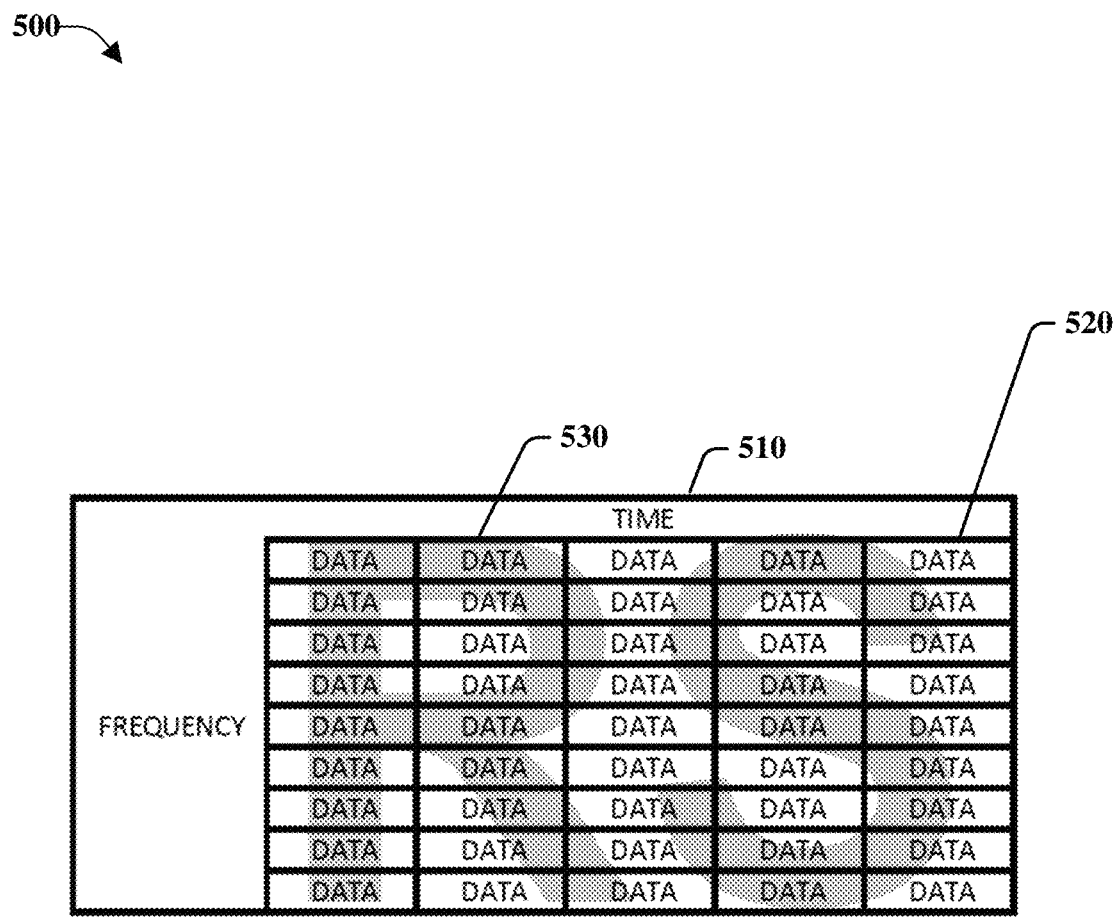
FIG. 5 depicts an example 500 of a time/frequency grid that illustrates some of the features discussed above, in accordance with one or more embodiments.

FIG. 5 depicts an example 500 of a time/frequency grid 510 that illustrates some of the features discussed above, in accordance with one or more embodiments. For purposes of brevity, description of like elements and/or processes employed in other embodiments is omitted.

In one or more embodiments, when a RS sequence is generated in delay-Doppler domain, each delay-Doppler sample can spread into all available time-frequency REs. As depicted at label 530, this spread RS signal can have less interference impact on individual REs, than other approaches.

Another benefit that can occur with the spreading affect is an increase in the signal strength of the RS signal. In some embodiments, this increase in signal strength can counter the increase the potential interference from DATA REs, e.g., spreading can potentially expose the RS to interference from every RE in grid 530.

In another aspect of one or more embodiments, when a CSI-RS is spread across large amount of orthogonal frequency-division multiplexing (OFDM) symbols and subcarrier (e.g., grid 530), a long CSI-RS sequence can occur in some circumstances. This can also cause an in processing capability as a result.

FIG. 6 illustrates an example formula that can be used with block 420 discussed above, that is, transforming the RS created in another domain (e.g., delay-Doppler) into the time/frequency domain for transmission, in accordance with one or more embodiments. For purposes of brevity, description of like elements and/or processes employed in other embodiments is omitted.

As noted above with FIG. 4, one approach that can be used by embodiments generates the RS in the delay-Doppler domain, then transforms it, using a symplectic Fourier transform into the time/frequency domain. The formula of FIG. 6 is an example of the second step. For example, label 610 is highlighting a representation of the RS in the time/frequency domain, e.g., RS (r') with time (n) and frequency (m). As a part of the function that can yield r'(n, m) 610, label 620 highlights a representation of RS in the delay-Doppler domain, RS (r) with an index in the delay bin (k) and an index in the doppler bin (1).

One having skill in the relevant arts, given the description herein, will recognize the other parts of the formula as a symplectic Fourier transform that can be tailored for the size of grid 530. For example, in the expression $N_{S,v}$ the (S, v) correspond to the size of the grid for which the spreading of the RS signal is targeted. Thus, because as noted above, a typical grid is 12 by 14, the values (S=12, v=14) can be used to tailor this formula to the typical grid size.

Figure 7:
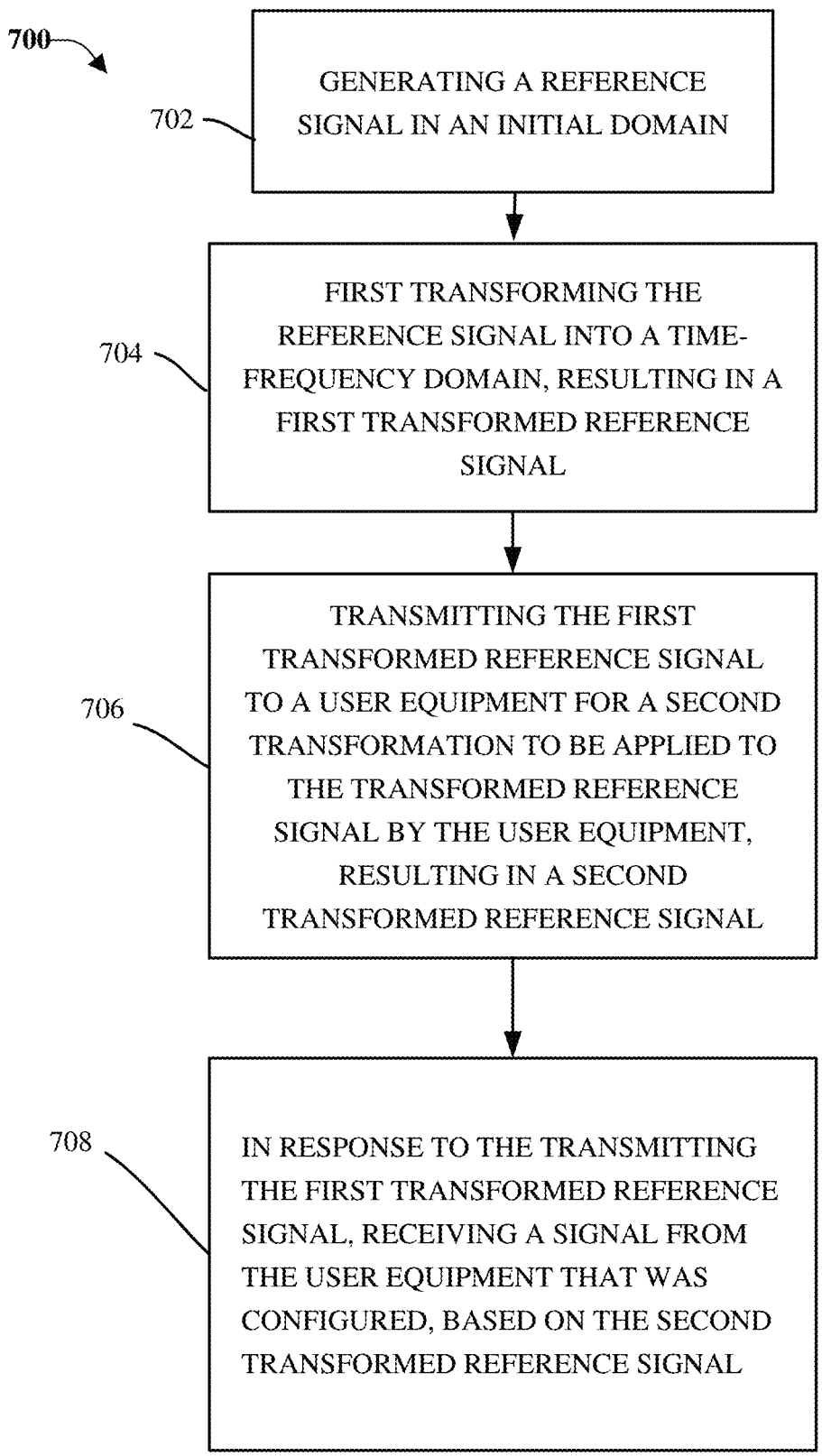
FIG. 7 is a flow diagram representing example operations of system that can facilitate transforming wireless reference signals into a different domain for transmission to a user equipment, in accordance with one or more embodiments.

FIG. 7 is a flow diagram representing example operations of system that can facilitate transforming wireless reference signals into a different domain for transmission to user equipment, in accordance with one or more embodiments.

At 702, the method can generate a reference signal in an initial domain. At 704, the method can first transform the reference signal into a time-frequency domain, resulting in a first transformed reference signal. At 706, the system can transmit the first transformed reference signal to a user equipment for a second transformation to be applied to the transformed reference signal by the user equipment, resulting in a second transformed reference signal. At 708, the system can in response to the transmitting the first transformed reference signal, receive, a signal from the user equipment that was configured, based on the second transformed reference signal.

Figure 8:
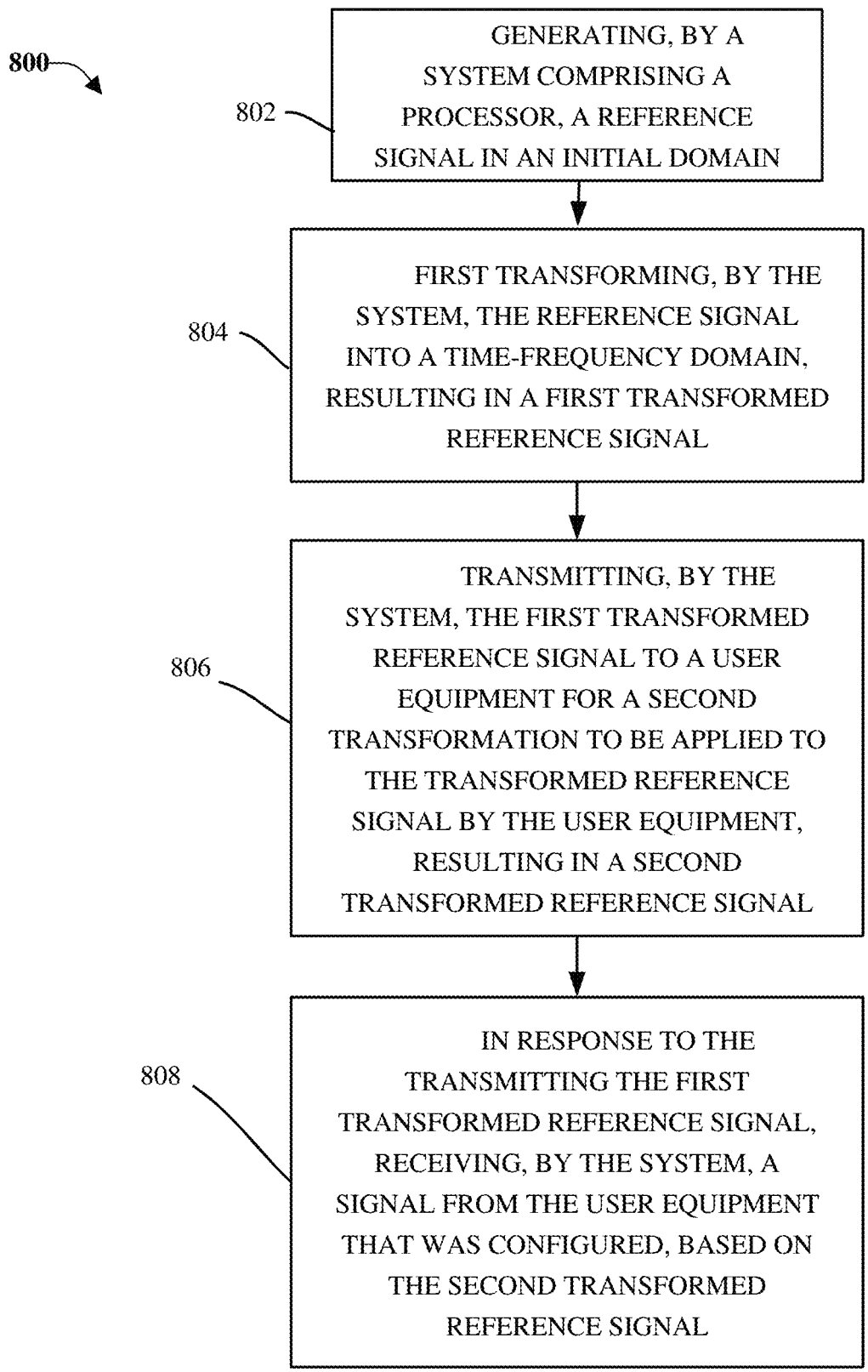
FIG. 8 illustrates a flow diagram of an example method that can facilitate transforming wireless reference signals into a different domain for transmission to user equipment, in accordance with one or more embodiments.

FIG. 8 illustrates a flow diagram of an example method 800 that can facilitate a wireless control plane having centralized and distributed control messages, in accordance with one or more embodiments. For purposes of brevity, description of like elements and/or processes employed in other embodiments is omitted.

At 802, the method can generate a reference signal in an initial domain. At 804, the method can first transform the reference signal into a time-frequency domain, resulting in a first transformed reference signal. At 806, the system can transmit the first transformed reference signal to a user equipment for a second transformation to be applied to the transformed reference signal by the user equipment, resulting in a second transformed reference signal. At 808, the system can, in response to the transmitting the first transformed reference signal, receive, a signal from the user equipment that was configured, based on the second transformed reference signal.

Figure 9:
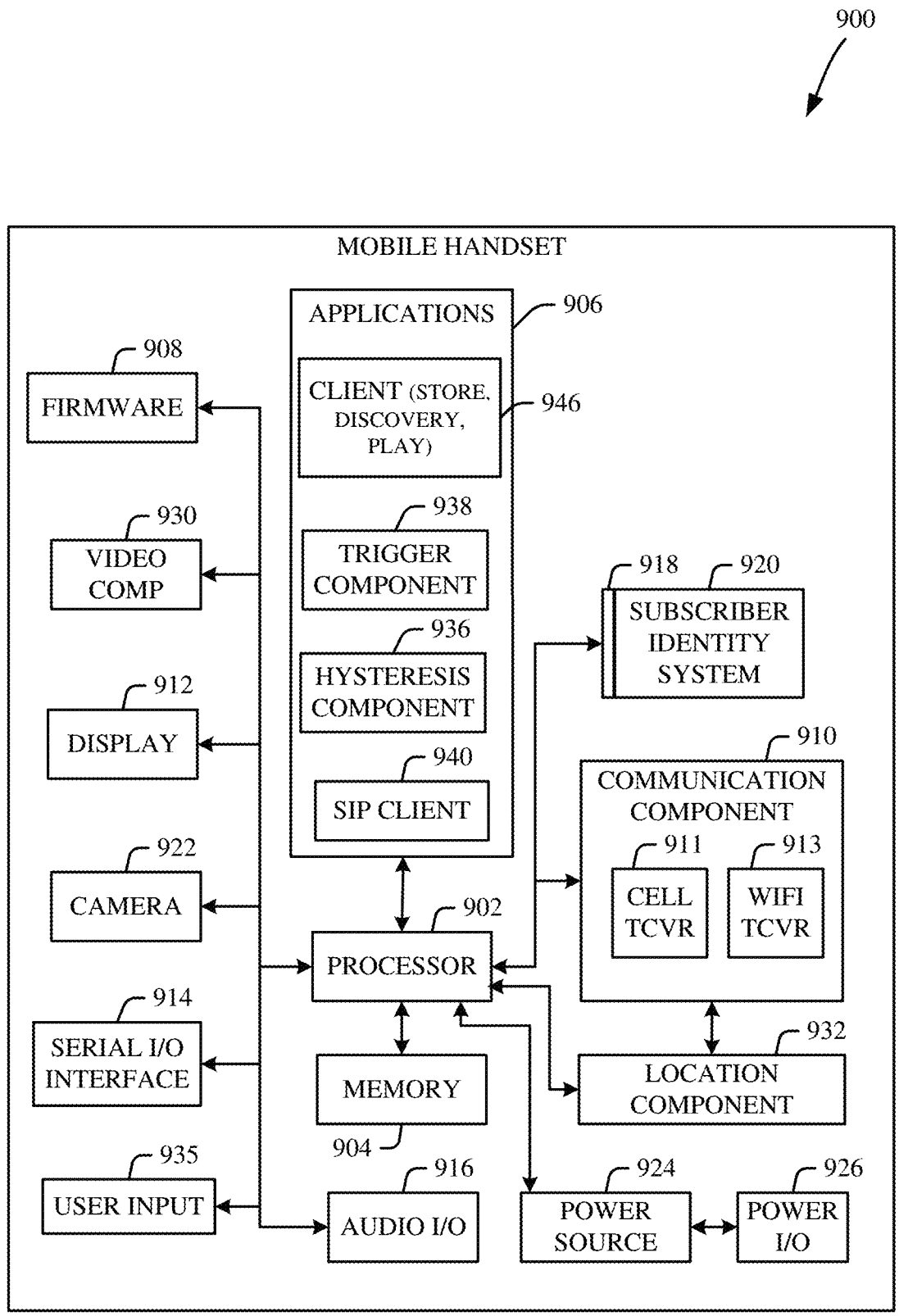
FIG. 9 illustrates an example block diagram of an example mobile handset operable to engage in a system architecture that can facilitate processes described herein, in accordance with one or more embodiments.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

As can be seen, the technology described herein can provide increased robustness and reduced latency of initial access and V2X configuration when control plane and mobility signaling is provided over a sub6-GHz anchor link via multi-connectivity, (compared to a standalone architecture), in which V2X-capable UEs provide initial access, IDLE mode, control plane, and mobility functionality. The technology can facilitate reduced overhead on mmWave backhaul links multiplexing cellular and V2X traffic (of one or more bands) by utilizing sub 6-GHz channels for control plane signaling instead of multiplexing both control and data links on mmWave bands. Still further, the technology described herein provides the ability to efficiently perform local manager configuration and association based on measurements/reports related to sidelink link quality metrics over sub6-GHz channels more efficiently than over the NR mmWave backhaul links. The technology described herein enables support for simultaneous cellular communication with a network infrastructure, in addition to V2X direct communication services on the same or different carriers.

In example implementations, user equipments are able to send and/or receive communication data via a wireless link to the network device. Wireless communication system 200 can thus include one or more communication service provider networks that facilitate providing wireless communication services to various user equipments via the network device and/or various additional network devices (as is understood) included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks can be or include the wireless communication network and/or various additional devices and components of the wireless communication network (e.g., additional network devices and cell, additional user equipments, network server devices, etc.).

The network device can be connected to one or more communication service provider networks via one or more backhaul links or the like (not shown). For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like.

The wireless communication system can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipments operate using multiple carriers, e.g. LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of systems described herein are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
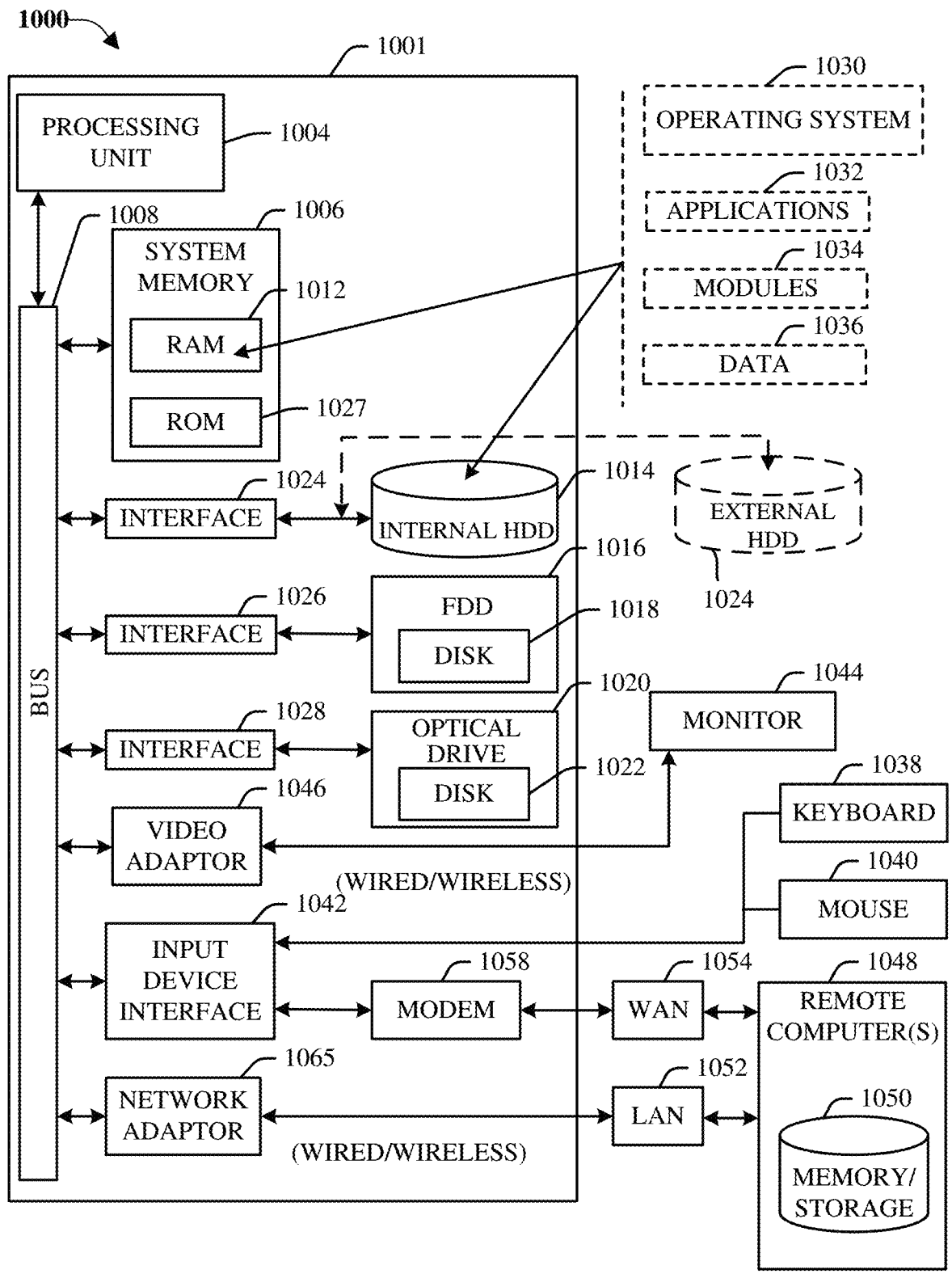
FIG. 10 illustrates an example block diagram of an example computer operable to engage in a system architecture that can facilitate processes described herein, in accordance with one or more embodiments.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 10 is but one example of a computing device.

In order to provide a context for the various aspects of the disclosed subject matter, FIG. 10 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of an operating environment 1000 operable to execute the disclosed systems and methods in accordance with an embodiment. Computer 1012, which can be, for example, part of the hardware of system 1020, includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, a mobile device and/or portable device can include a user interface embodied in a touch sensitive display panel allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 and a move use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:
1. A system, comprising:
a processor; and
a memory that stores executable instructions that, when executed by the processor, facilitate performance of operations, comprising:

generating a reference signal in an initial domain;
transforming the reference signal into a time-frequency domain, resulting in a first transformed reference signal, wherein the transforming spreads portions of the reference signal across a time-frequency grid of available resources shared with other devices other than the system;
analyzing a first signal strength of data signals using shared resource blocks of the time-frequency grid, resulting in a data signal strength value;
without avoiding interference by the portions of the reference signal with the data signals using the shared resource blocks of the time-frequency grid, spreading the portions by non-orthogonally multiplexing respective portions of the reference signal with the other signals using the shared resource blocks, resulting in a combined signal, wherein, based on the data signal strength value, a second signal strength for the respective portions of the reference signal was selected to:
  counter potential interference by the data signals during the spreading of the portions, and
  increase performance of processing the respective portions of the reference signal by the user equipment by increasing a length of a sequence of reference signal information comprised in the respective portions;
transmitting, to the user equipment, the combined signal in accordance with the time-frequency grid for a further transformation to be applied by the user equipment comprising:
  based on the processing of the respective portions of the reference signal as interference to the combined signal, decoding a signal of the other signals from the combined signal,
  transforming the respective portions of the reference signal into the initial domain, resulting in a second transformed reference signal, and
  decoding the reference signal from the second transformed reference signal; and
in response to the transmitting, receiving a second signal from the user equipment that was configured, based on the second transformed reference signal.

2. The system of claim 1, wherein the transforming comprises transforming the reference signal by employing a Fourier transform.

3. The system of claim 2, wherein the Fourier transform comprises a symplectic Fourier transform.

4. The system of claim 1, wherein the initial domain comprises a delay-Doppler domain.

5. The system of claim 1, wherein the decoding of the respective portions of the reference signal multiplexed with the other signals comprises demultiplexing by filtering the other signals.

6. The system of claim 5, wherein the non-orthogonal multiplexing comprises overlaying the first transformed reference signal at a signal strength less than another signal strength associated with the other signals, and wherein a difference between the signal strength and the other signal strength was selected to reduce interference to the other signals.

7. The system of claim 1, wherein the reference signal comprises a channel state information reference signal.

8. The system of claim 1, wherein the transforming amplifies the reference signal.

9. A method, comprising:
generating, by a system comprising a processor, a reference signal in an initial domain;
transforming, by the system, the reference signal into a time-frequency domain, resulting in a first transformed reference signal, wherein the transforming spreads portions of the reference signal across a time-frequency grid of available resources shared with other devices other than the system;
analyzing, by the system, a first signal strength of data signals using shared resource blocks of the time-frequency grid, resulting in a data signal strength value;
without avoiding interference by the portions of the reference signal with the data signals using the shared resource blocks of the time-frequency grid, spreading, by the system, the portions by non-orthogonally multiplexing respective portions of the reference signal with the other signals using the shared resource blocks, resulting in a combined signal, wherein, based on the data signal strength value, a second signal strength for the respective portions of the reference signal was selected to:
counter potential interference by the data signals during the spreading of the portions, and
increase performance of processing, by the user equipment, the respective portions of the reference signal by increasing a length of a sequence of reference signal information comprised in the respective portions;
transmitting, by the system to the user equipment, the combined signal in accordance with the time-frequency grid for a further transformation to be applied by the user equipment comprising:
  based on the processing of the respective portions of the reference signal as interference to the combined signal, decoding a signal of the other signals from the combined signal,
  transforming the respective portions of the reference signal into the initial domain, resulting in a second transformed reference signal, and
  decoding the reference signal from the second transformed reference signal; and
in response to the transmitting, receiving, by the system, a second signal from the user equipment that was configured, based on the second transformed reference signal.

10. The method of claim 9, wherein the transforming comprises transforming the reference signal by employing a Fourier transform.

11. The method of claim 10, wherein the Fourier transform comprises a symplectic Fourier transform.

12. The method of claim 9, wherein the initial domain comprises a delay-Doppler domain.

13. The method of claim 9, wherein the transforming amplifies the reference signal.

14. The method of claim 9, wherein the decoding of the respective portions of the reference signal multiplexed with the other signals comprises demultiplexing by filtering the other signals.

15. The method of claim 9, wherein the reference signal comprises a channel state information reference signal.

16. A non-transitory machine-readable medium, comprising executable instructions that, when executed by a processor of network equipment, facilitate performance of operations, comprising:
generating a reference signal in an initial domain;
transforming the reference signal into a time-frequency domain, resulting in a first transformed reference signal, wherein the transforming spreads portions of the reference signal across a time-frequency grid of available resources shared with other devices other than the system;

analyzing a first signal strength of data signals using shared resource blocks of the time-frequency grid, resulting in a data signal strength value;

without avoiding interference by the portions of the reference signal with the data signals using the shared resource blocks of the time-frequency grid, spreading the portions by non-orthogonally multiplexing respective portions of the reference signal with the other signals using the shared resource blocks, resulting in a combined signal, wherein, based on the data signal strength value, a second signal strength for the respective portions of the reference signal was selected to:

counter potential interference by the data signals during the spreading of the portions, and increase performance of processing the respective portions of the reference signal by the user equipment by increasing a length of a sequence of reference signal information comprised in the respective portions;

transmitting, to the user equipment, the combined signal in accordance with the time-frequency grid for a further transformation to be applied by the user equipment comprising:

based on processing the respective portions of the reference signal as interference to the combined signal, decoding the other signals into a data stream from the combined signal, transforming the respective portions of the reference signal into the initial domain, resulting in a second transformed reference signal, and decoding the reference signal from the second transformed reference signal; and in response to the transmitting, receiving a second signal from the user equipment that was configured based on the second transformed reference signal.

17. The non-transitory machine-readable medium of claim 16, wherein the transforming comprises transforming the reference signal by employing a symplectic Fourier transform based on a selected size of a selected subset of the available resources of the time-frequency grid.

18. The non-transitory machine-readable medium of claim 16, wherein the initial domain comprises a delay-Doppler domain.

19. The non-transitory machine-readable medium of claim 16, wherein the decoding of the respective portions of the reference signal multiplexed with the other signals comprises demultiplexing by filtering the other signals.

20. The non-transitory machine-readable medium of claim 16, wherein the reference signal comprises a channel state information reference signal.

* * * * *